US 11,190,036 B2

(12) United States Patent
Hiratsuka (10) Patent No.: US 11,190,036 B2
(45) Date of Patent: Nov. 30, 2021

(54) POWER SUPPLY DEVICE WITH REPLACEABLE BATTERIES AND POWER SUPPLY CONTROL METHOD

(71) Applicant: MIRAI-LABO KABUSHIKI KAISHA, Hachioji (JP)

(72) Inventor: Toshio Hiratsuka, Hachioji (JP)

(73) Assignee: MIRAI-LABO KABUSHIKI KAISHA, Hachioji (JP)

( * ) Notice: Subject to any disclaimer, the term of this patent is extended or adjusted under 35 U.S.C. 154(b) by 0 days.

(21) Appl. No.: 16/623,002

(22) PCT Filed: May 30, 2018

(86) PCT No.: PCT/JP2018/020715
§ 371 (c)(1),
(2) Date: Dec. 16, 2019

(87) PCT Pub. No.: WO2019/008953
PCT Pub. Date: Jan. 10, 2019

(65) Prior Publication Data
US 2020/0395771 A1    Dec. 17, 2020

(30) Foreign Application Priority Data
Jul. 7, 2017    (JP) .............................. JP2017-133639

(51) Int. Cl.
*H02J 7/00*    (2006.01)
*H01M 10/44*    (2006.01)
(Continued)

(52) U.S. Cl.
CPC ......... *H02J 7/0045* (2013.01); *H01M 10/441* (2013.01); *H01M 10/482* (2013.01);
(Continued)

(58) Field of Classification Search
CPC . G01R 31/382; G01R 31/396; H01M 10/482; H01M 10/425; H01M 10/48; H02J 13/0003; H02J 7/0021; H02J 7/02
(Continued)

(56) References Cited

U.S. PATENT DOCUMENTS 7,075,306 B2 *    7/2006    Emori ................... H02J 7/0021
324/430
7,319,333 B2 *    1/2008    Emori ................... H02J 7/0016
324/430
(Continued)

FOREIGN PATENT DOCUMENTS

CN    101989752 A    *    3/2011
EP    2091125 A2    *    8/2009    ............ H02J 7/0045
(Continued)

OTHER PUBLICATIONS

International Search Report dated Aug. 14, 2018, issued for PCT/JP2018/020715.

*Primary Examiner* — John T Trischler
(74) *Attorney, Agent, or Firm* — Locke Lord LLP (57) ABSTRACT

A power supply device and a power supply control method with which charging and electric power supply can be continued efficiently, and a charge capacity can be added is disclosed. A power supply device including: plural battery units replaceably connected to a battery connection part, an output unit for outputting electric power from the battery unit to a load, and a control unit for controlling connection of the plural battery units with respect to the output unit, wherein the control unit selects a battery unit having a remaining charge amount that is smallest among the plural battery units and equal to or greater than a first predetermined amount, and connects the selected battery unit to the output unit.

6 Claims, 5 Drawing Sheets

(51) Int. Cl.
*H01M 10/48* (2006.01)
*H02J 9/06* (2006.01)

(52) U.S. Cl.
CPC .......... *H02J 7/0013* (2013.01); *H02J 7/0029* (2013.01); *H02J 7/0048* (2020.01); *H02J 9/062* (2013.01)

(58) Field of Classification Search
USPC ........................................................ 320/134
See application file for complete search history.

(56) References Cited

U.S. PATENT DOCUMENTS

| | | | | |
|---|---|---|---|---|
| 7,535,196 B2* | 5/2009 | Nagasawa | ............... | H02J 9/061 320/114 |
| 7,692,430 B2* | 4/2010 | Emori | ................... | H02J 7/0016 324/430 |
| 7,785,729 B2* | 8/2010 | Okumura | ............ | H01M 10/425 429/49 |
| 7,986,128 B2* | 7/2011 | Kubota | ............... | H02J 7/00047 320/124 |
| 8,120,365 B2* | 2/2012 | Emori | ................... | H02J 7/0022 324/430 |
| 8,655,524 B2* | 2/2014 | Ichikawa | ................ | B60L 58/24 701/22 |
| 8,798,832 B2* | 8/2014 | Kawahara | ............ | B60L 1/003 701/22 |
| 9,214,814 B2* | 12/2015 | Yasutomi | ................. | H02J 3/38 |
| 9,553,474 B2* | 1/2017 | Haraguchi | ............ | H02J 50/20 |
| 9,705,359 B2* | 7/2017 | Boyd | ................. | H01M 2/1005 |
| 9,893,633 B1* | 2/2018 | Li | ..................... | H02M 3/33546 |
| 10,003,106 B2* | 6/2018 | Jeon | ...................... | H01M 10/44 |
| 10,008,862 B2* | 6/2018 | Takizawa | ............ | H01M 10/46 |
| 10,259,337 B2* | 4/2019 | Alser | ..................... | H02P 27/06 |
| 10,367,373 B2* | 7/2019 | Boyd | ................. | H01M 2/1005 |
| 10,693,311 B2* | 6/2020 | Hiratsuka | ........... | H02J 7/00712 |
| 10,790,548 B1* | 9/2020 | Jalan | .................. | H01M 2/1077 |
| 2004/0138785 A1* | 7/2004 | Emori | ................... | H02J 7/0016 700/286 |
| 2005/0052155 A1* | 3/2005 | Surig | .................... | H02J 7/0021 320/116 |
| 2005/0083014 A1* | 4/2005 | Baumgartner | ...... | H02J 7/00041 320/116 |
| 2005/0162132 A1* | 7/2005 | Nagasawa | ............... | H02J 9/061 320/128 |
| 2006/0012372 A1* | 1/2006 | Emori | ................... | H02J 7/0021 324/413 |
| 2006/0109008 A1* | 5/2006 | Emori | ................... | H02J 7/0021 324/430 |
| 2008/0084179 A1* | 4/2008 | Emori | ................... | H02J 7/0022 320/109 |
| 2008/0122400 A1* | 5/2008 | Kubota | ............... | H02J 7/00047 320/106 |
| 2010/0148728 A1* | 6/2010 | Emori | ................... | H02J 7/0022 320/134 |
| 2011/0313613 A1* | 12/2011 | Kawahara | ............ | H01M 10/48 701/34.4 |
| 2013/0271080 A1* | 10/2013 | Yoshida | .................... | H02J 7/00 320/109 |
| 2014/0152099 A1 | 6/2014 | Boyd | | |
| 2014/0175873 A1* | 6/2014 | Kishimoto | ............ | H02J 7/0014 307/10.1 |
| 2014/0184161 A1* | 7/2014 | Deal | ..................... | H02J 7/0014 320/121 |
| 2014/0223204 A1* | 8/2014 | Haraguchi | ................ | G06F 1/26 713/300 |
| 2014/0370940 A1* | 12/2014 | Yoshida | .............. | H01M 10/443 455/572 |
| 2015/0194707 A1* | 7/2015 | Park | .................. | H01M 10/4207 429/50 |
| 2017/0005512 A1* | 1/2017 | Boyd | ........................ | H02J 9/04 |
| 2018/0219387 A1* | 8/2018 | Ishikawa | ............... | H02J 7/0026 |
| 2019/0073012 A1* | 3/2019 | Sultenfuss | ............. | H02J 7/007 |
| 2019/0341800 A1* | 11/2019 | Hiratsuka | ............ | H02J 7/0029 |
| 2020/0144845 A1* | 5/2020 | Facchini | ............... | H02J 7/00034 |

FOREIGN PATENT DOCUMENTS

| | | | | | |
|---|---|---|---|---|---|
| GB | 2507955 A | * | 5/2014 | ............ | H02J 7/0013 |
| JP | 2005-237189 A | | 9/2005 | | |
| JP | 2006-296109 A | | 10/2006 | | |
| JP | 2010-098874 A | | 4/2010 | | |
| JP | 2010-236810 A | | 10/2010 | | |
| JP | 2016-115323 A | | 6/2016 | | |
| JP | 2017-005915 A | | 1/2017 | | |
| JP | 2017-112689 A | | 6/2017 | | |
| WO | WO-2014120912 A1 | * | 8/2014 | ............ | H01M 10/46 |

\* cited by examiner

POWER SUPPLY DEVICE WITH REPLACEABLE BATTERIES AND POWER SUPPLY CONTROL METHOD

TECHNICAL FIELD

The present invention relates to a power supply device and a power supply control method.

BACKGROUND ART

Conventionally, emergency power supplies that have a solar cell and a battery combined are proposed. These emergency power supplies are expected to be used as a power supply for disaster recovery operations and or a power supply for daily life in a case where a large-scale disaster occurs and no electric power is supplied from a commercial electric power system.

Patent Document 1 describes a portable power supply device in which a solar cell panel, a battery, and an inverter are accommodated in a portable cart. In Patent Document 1, each of the devices that is needed from the generating of electric power with solar power to the outputting of the electric power is accommodated in a single portable cart. Thereby, electric power cost can be reduced and mobility can be attained.

Patent Document 2 discloses a photovoltaic power generation system in which a flexible solar battery module, a charge controller, and a charge cradle are connected to each other. By connecting a replaceable secondary battery module to the charge cradle, the secondary battery module can be charged with photovoltaic generated electric power. In Patent Document 2, the power generation amount and portability can be attained by using a flexible large-area solar battery module as a solar battery module and downsizing the charge controller and the charge cradle. Further, by using a module type enabling replacement of secondary batteries and allowing the replacement of plural secondary battery modules, the charge capacity can be added. Thereby, the maximum charge capacity can be substantially expanded.

PRIOR ART DOCUMENTS

Patent Documents

Patent Document 1: Japanese Laid-Open Patent Publication No. 2016-115323
Patent Document 2: Japanese Laid-Open Patent Publication No. 2017-112689

SUMMARY OF THE INVENTION

Problem to be Solved by the Invention

However, with the conventional art of Patent Document 1, it is difficult to increase the amount of power generated per unit time because the area of the solar battery panel is limited to that which can be accommodated in the portable cart. Further, because the battery is mounted inside the portable cart, the size of the battery is limited to that which can be accommodated in the portable cart. Thus, it is difficult to increase the maximum charge capacity. Further, it becomes necessary to increase the size of the portable cart for realizing the amount of power generation and the maximum charge capacity required as the emergency power supply. This leads to the problem of mobility becoming difficult.

On the other hand, with the conventional art of Patent Document 2, the size of the secondary battery module would be restricted and the charge capacity of one secondary battery module would be limited if importance is placed on portability. Thus, the secondary battery module would need to be frequently replaced for ensuring the charge capacity of the entire system. Further, in a case where plural charged secondary battery modules are used as an emergency power supply, one secondary battery module would be required to be replaced with another at a timing when the charge capacity of the one secondary battery module is exhausted. Therefore, it is difficult to continuously use the secondary battery module.

In view of the above-mentioned conventional problems, the present invention aims to provide a power supply device and a power supply control method that can continue to efficiently charge and supply electric power and add a charge capacity.

Means for Solving the Problem

In order to solve the above-mentioned problems, the power supply device of the present invention is characterized by including plural battery units replaceably connected to a battery connection part, an output unit for outputting electric power from the battery unit to a load, an input unit for supplying electric power to the battery unit, and a control unit for controlling connection of the plural battery units with respect to the output unit and the input unit, wherein the control unit selects a battery unit having a remaining charge amount that is smallest among the plural battery units and equal to or greater than a first predetermined amount, and connects the selected battery unit to the output unit, wherein the control unit selects a battery unit having a remaining charge amount that is the largest among the plural battery units and equal to or greater than a second predetermined amount, and connects the selected battery unit to the input unit, wherein the control unit detects connection states of the input unit, the output unit, and the plurality of battery units, and reselects the battery units to be connected to the input unit and the output unit in a case where any of the connection states changes.

With a power supply device of the present invention, it is possible to prevent all of the battery units from being depleted at the same time and continue to efficiently charge and supply electric power while adding a charge capacity.

Further, according to one aspect of the present invention, the battery connection part includes a locking unit for securing a connection of the battery unit, wherein the control unit excludes the battery unit connected to the battery connection part from a control target in a case where the locking unit is in an unconnected state.

Further, in order to solve the above problems, a power supply control method of the present invention is a power supply control method for controlling an electric power supply from plural battery units replaceably connected to a battery connection part to an output unit and an electric power supply from an input unit to the plural battery units, the power supply control method includes: a measuring step for measuring a remaining charge amount of the plural battery units, an output selection step for selecting a battery unit having a remaining charge amount that is smallest among the plural battery units and equal to or greater than a first predetermined amount, an output connection step for connecting the output unit to the battery unit selected in the output selection step, an input selection step for selecting a battery unit having a remaining charge amount that is largest among the plural battery units and less than a second predetermined amount, an input connection step for connecting the input unit to the battery unit selected in the input selection step, and a connection state detection step for detecting connection states of the input unit, the output unit, and the plural battery units, and executing the output selection step and the input selection step in a case where any of the connection states changes.

According to the power supply control method of the present invention, all of the battery units can be prevented from being depleted at the same time, and efficient charging and supplying of power can be continued while adding charge capacity.

According to another aspect of the present invention, there is further provided a detection step for detecting a state of a locking unit that secures a connection of the battery unit, and an exclusion step for excluding the battery unit determined to be in an unconnected state in the detection step from a control target.

Effects of the Invention

According to the present invention, it is possible to provide a power supply device and a power supply control method that capable of continuing to efficiently charge and supply power, and capable of adding a charge capacity.

BRIEF DESCRIPTION OF THE DRAWINGS

FIG. 1(a) is a schematic cross-sectional view illustrating the entire configuration of the power supply device 100. FIG. 1(b) is a schematic diagram illustrating the operation panel 40.

FIG. 2(a) is a schematic perspective view.

FIG. 2(b) is a schematic bottom view.

MODES FOR CARRYING OUT THE INVENTION

First Embodiment

Figure 1:
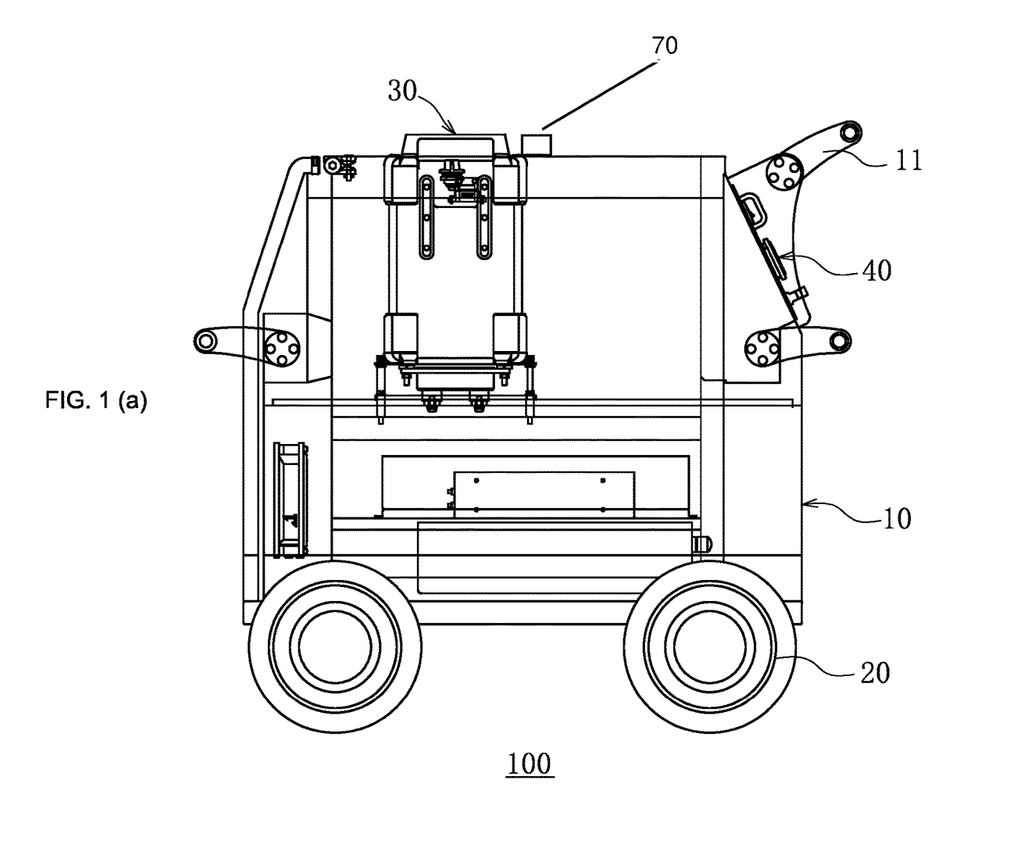
FIG. 1 is a schematic diagram illustrating a power supply device 100 according to the first embodiment.

Hereinafter, embodiments of the present invention are described in detail with reference to the drawings. The same or equivalent components, members, and processes illustrated in the respective drawings are denoted by the same reference numerals, and duplicate descriptions are omitted as appropriate. FIG. 1 is a schematic diagram illustrating a power supply device 100 according to the present embodiment, FIG. 1(a) is a schematic cross-sectional view illustrating the entire configuration of the power supply device 100, and FIG. 1(b) is a schematic diagram illustrating an operation panel 40. As illustrated in FIG. 1(a), the power supply device 100 includes a housing 10, wheels 20, a battery unit 30, and an operation panel 40.

The housing 10 is a component for accommodating and internally connecting each member therein. The housing 10 accommodates and replaceably retains the plural battery units 30 therein. Plural wheels 20 are attached to a bottom part of the housing 10. The operation panel 40 is attached to an upper part of a side surface that can be easily operated by the user. A handle 11 is provided at the front and rear of the housing 10. The portion of the housing 10 in which the battery unit 30 is accommodated has a function of connecting and fixing the battery unit 30. The whole of the portion of the housing 10 corresponds to the battery connecting part of the present invention.

The wheels 20 are components that are rotatably supported by the bottom part of the housing 10. By having the user operate the handle 11 of the housing 10, the wheels 20 rotate to allow the power supply device 100 to move. A steering device or a braking device may be provided to the steering wheel 11 or the wheels 20. The wheels 20 may be driven by a motor or the like.

The battery unit 30 is a secondary battery that is replaceably accommodated in a mounting position of the housing 10. As the material of the secondary battery included in the battery unit 30, a conventionally known lead battery, a nickel metal hydride battery, a lithium ion battery, or the like can be used. It is preferable to use a lithium ion battery for improving the portability of the power supply device 100. A circuit such as a protection circuit or a discharge control circuit is mounted on the battery unit 30 for supplying a current to the load while controlling the current. Further, the power supply may be shut off when in a fully charged state, or discharging may be stopped when the voltage is lower than a predetermined voltage value.

The operation panel 40 is a member for operating charging and discharging by connecting a charging source and a load to the power supply device 100. The operation panel 40 is also for indicating a state of the power supply device 100 including the battery unit 30.

As illustrated in FIG. 1b), the operation panel 40 includes a display unit 41, input units 42a and 42b, an output unit 43, an output switch 44, and a main switch 45.

The display unit 41 is a device for displaying various types of information of the power supply device 100. The display unit 41 may be, for example, a liquid crystal display device or the like. A control program is executed by an information processing unit mounted on the housing 10, and the display screen is controlled by generating character information and image information. A touch panel type liquid crystal display device may be used as the display unit 41 and may also be used as an information input unit for inputting a predetermined operation.

The input units 42a and 42b are connectors for supplying a current from an external electric power supply to the power supply device 100. The external electric power supply that is connected to the input units 42a and 42b may be a commercial power supply or a solar battery panel.

The output unit 43 is a connector for supplying a current from the power supply device 100 to an external load. The output standard of the output unit 43 is not limited in particular. However, it is preferable that the voltage and the frequency are the same as those of the commercial power supply for driving the electric equipment that are used by being connected to the commercial power supply. Here, an example in which one output unit 43 is provided is illustrated, but plural output units 43 of different types may be provided.

The output switch 44 is a switch for determining whether to supply electric power to the wiring connected to the output unit 43. In a case where the output switch 44 is turned on, the wiring from the battery unit 30 to the output unit 43 is connected. In a case where the output switch 44 is turned off, the wiring is disconnected. The on/off of the output switch 44 is for finally determining the supply of electric power from the output unit 43 to the outside. The on/off of the output switch 44 can be set independent from the charge control and the discharge control of the battery unit 30 of the power supply device 100.

The main switch 45 is a switch for starting the control of the entire power supply device 100. In a case where the main switch 45 is turned on, a power supply control method described below is executed. In a case where the main switch 45 is turned off, the power supply control method is stopped.

Figure 2:
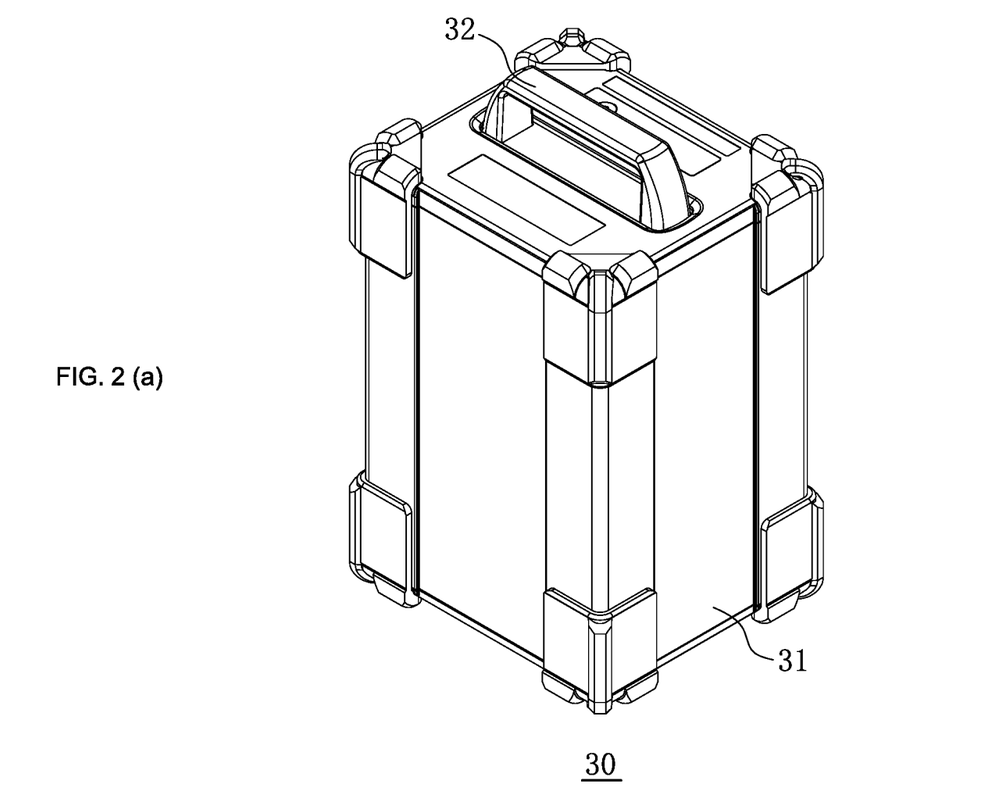
FIG. 2 is a schematic diagram illustrating an outline of the battery unit 30 according to the first embodiment.

FIG. 2 is a schematic view illustrating the outline of the battery unit 30 according to the present embodiment. FIG. 2(*a*) is a schematic perspective view, and FIG. 2(*b*) is a schematic bottom view. As illustrated in FIGS. 2(*a*) and 2(*b*), the battery unit 30 includes a battery main body 31, a handle part 32, and a battery connector 33.

The battery main body 31 is a housing in which cells, electrodes, control circuits, and the like of the secondary battery are accommodated. The handle part 32 is provided on the top surface of the battery main body 31. The battery connector 33 is provided on the bottom surface of the battery main body 31. The outer shape of the battery main body 31 is a substantially rectangular parallelepiped shape corresponding to the accommodating portion provided in the housing 10. In the example illustrated in FIG. 2, the battery main body 31 has a substantially rectangular parallelepiped shape. However, the battery main body 31 may have any given shape such as a substantially cylindrical shape or a substantially flat plate shape.

The handle part 32 is attached to the top surface of the battery main body 31. The handle part 32 is a component for facilitating the user to carry the battery unit 30 by grasping the handle part 32. The position where the handle part 32 is provided may be other than the top surface. Two handle parts 32 may be provided and handled with both hands depending on the weight of the battery unit 30.

The battery connector 33 is a connector provided on the bottom surface of the battery main body 31. The battery connector 33 has a shape corresponding to a connection part on the main body side provided at a corresponding position of the housing 10. The battery connector 33 ensures mechanical connection with the connection part on the housing 10 side. Further, the battery connector 33 has an electrical contact to which a wiring inside the battery main body 31 is connected, and ensures electrical connection with a connection part on the housing 10 side.

When the battery unit 30 is inserted from above to a predetermined position of the power supply device 100 illustrated in FIG. 1(*a*), the connection part on the housing 10 side is mechanically and electrically connected to the battery connector 33. When the battery unit 30 is connected to the power supply device 100, the control circuit inside the battery unit 30 and the circuit on the housing 10 side are connected. Thereby, information transmission and input/output of electric power between the housing 10 and the battery unit 30 become possible.

After the battery unit 30 is inserted, a locking unit 70 is turned on to prohibit extraction of the battery unit 30. As the locking unit 70, a conventionally known structure may be used. For example, a structure that restrains the top surface of the battery unit 30 with a regulating member provided on the housing 10 side may be used. Alternatively, a latch structure with respect to the battery connector 33 may be used. The locking unit 70 is provided with a sensor that detects turning on/off and is connected to a control circuit of the power supply device 100.

Figure 3:
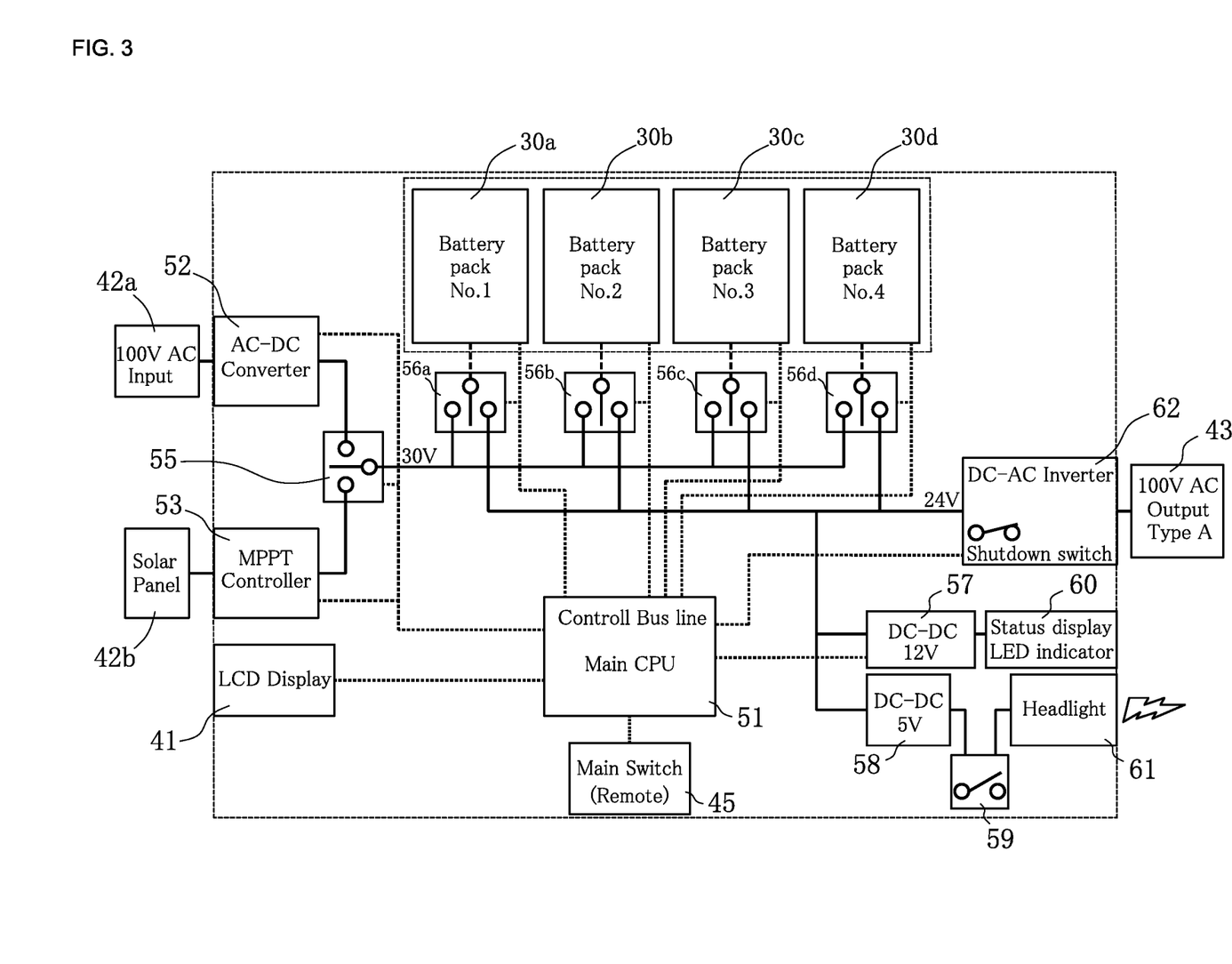
FIG. 3 is a block diagram illustrating a circuit configuration of a power supply device 100 according to the first embodiment.

FIG. 3 is a block diagram illustrating a circuit configuration of the power supply device 100 according to the present embodiment. As illustrated in FIG. 3, the control circuit of the power supply device 100 includes a main CPU (Central Processing Unit) 51, an AC/DC converter 52, an MPPT (Maximum Power Point Tracking) controller 53, an input changeover switch 55, charge/discharge switches 56*a* to 56*d*, DC/DC converters 57 and 58, an illumination switch 59, an indicator 60, an illumination unit 61, and a DC/AC inverter 62. The display unit 41, the input units 42*a* and 42*b*, the output unit 43, the output switch 44, and the main switch 45 illustrated in FIG. 1(*b*) are also connected to each of the parts of the control circuit of the power supply device 100.

The main CPU 51 is an information processing device which is connected to each element of the power supply device for acquiring information of each part of the power supply device and controlling the operation of each part of the control circuit. Further, the main CPU 51 executes power supply control methods described below by calling programs provided internally or externally stored by a storage unit. The main switch 45 is connected to the main CPU 51. By turning the main switch on/off, the main CPU 51 switches the starting and stopping of the charge/discharge control of the battery units 30*a* to 30*d*.

The AC/DC converter 52 is a converter in which its input side is connected to the input part 42*a* for converting an alternating current into a direct current and outputting the direct current to its output side. The output side of the AC/DC converter 52 is connected to the input changeover switch 55. A commercial power supply can be connected to the input unit 42*a*. The input unit 42*a* converts, for example, an alternating current of 100 V supplied from the commercial power supply into a direct current of 30 V.

The MPPT controller 53 is a maximum-power point tracking controller in which its input side is connected to the input unit 42*b* and its output side is connected to the input changeover switch 55. A solar battery panel can be connected to the input unit 42*b*. The input unit 42*b* converts a current and a voltage value and outputs the converted current and voltage value, so that the electric power supplied from the solar battery panel is maximized.

The input changeover switch 55 is a switch for selecting the output side of the AC/DC converter 52 and the output side of the MPPT controller 53. As indicated by a broken line in FIG. 3, the output side of the input changeover switch 55 is connected to the charging terminals of the charge/discharge changeover switches 56*a* to 56*d*, respectively.

The charge/discharge changeover switches 56*a* to 56*d* are provided with a charging terminal, a discharging terminal, and a battery side terminal. charge/discharge changeover switches 56*a* to 56*d* are switches for switching charging and discharging of the battery units 30*a* to 30*d*. The charging terminals of the charge/discharge changeover switches 56*a* to 56*d* are connected to the output side of the input changeover switch 55, and the battery side terminal is connected to the battery units 30*a* to 30*d*, respectively. The discharging terminals of the charge/discharge changeover switches 56*a* to 56*d* are connected to the DC/AC inverter 62 and the DC/DC converters 57 and 58.

The DC/DC converters 57 and 58 are connected to the discharging terminals of the charge/discharge changeover switches 56*a* to 56*d*, respectively. The DC/DC converters 57 and 58*d* are voltage converters for converting and outputting the voltage of the DC current supplied from the battery unit 30. For example, the output of the DC/DC converter 57 is connected to an indicator 60, which drives the indicator 60 by supplying a power supply voltage of 12 V. The output of the DC/DC converter 58 is connected to the illumination unit 61 via the illumination switch 59. The DC/DC converter 58 supplies power supply voltages of 5 V to drive the illumination unit 61.

The illumination switch 59 is a switch for switching between connection and disconnection of the DC/DC converter 58 and the illumination unit 61. The indicator 60 is a component that is supplied with electric power from the DC/DC converter 57 to indicate the discharge state. The indicator 60 is formed of a light emitting element such as an LED (Light Emitting Diode). The illumination unit 61 is an illumination device using a light-emitting element such as an LED. The illumination unit 61 is turned on and off in conjunction with the operation of the illumination switch 59.

The DC/AC inverter 62 is connected to the discharging terminals of the charge/discharge changeover switches 56a to 56d. The DC/AC inverter 62 is a converter for converting the DC currents output from the battery units 30a to 30d into AC currents. The output of DC/AC inverter 62 is connected to the output unit 43. The DC/AC inverter 62 supplies power to an external load via the output unit 43. For example, with a configuration where the DC/AC inverter 62 converts the output from the battery units 30a to 30d of 24 V into AC of 100 V and outputs to the output unit 43, an electric facility using a common commercial power supply can be connected to the output unit 43. By providing the output switch 44 on the output side or the input side of the DC/AC inverter 62 and turning off the output switch 44, the output from the output unit 43 can be forcibly cut off. Thereby, the discharging of the battery units 30a to 30d can be stopped, so that only the charging operation is performed.

Next, an operation of the power supply device 100 of the present embodiment will be described with reference to FIGS. 4 and 5.

Figure 4:
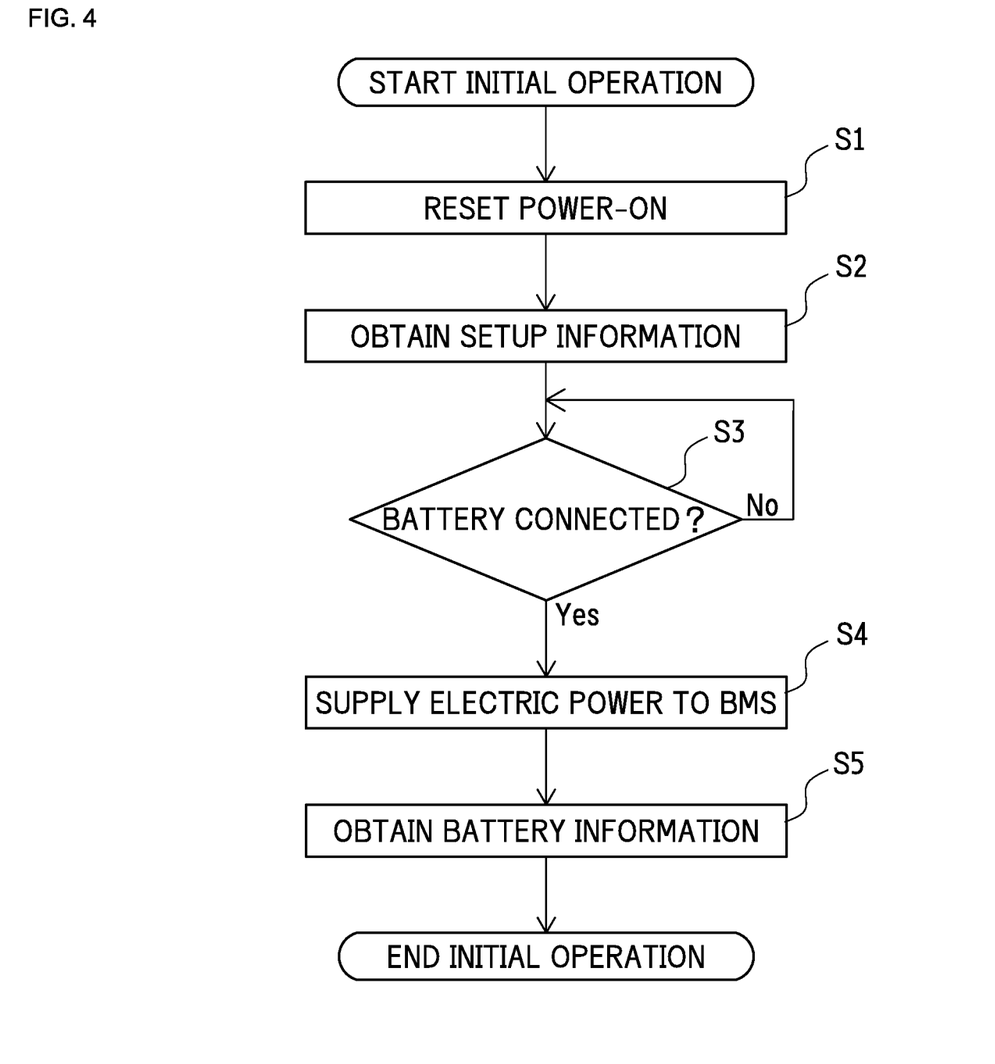
FIG. 4 is a flowchart illustrating an initial operation of the power supply device 100.

FIG. 4 is a flowchart illustrating an initial operation of the power supply device 100.

Figure 5:
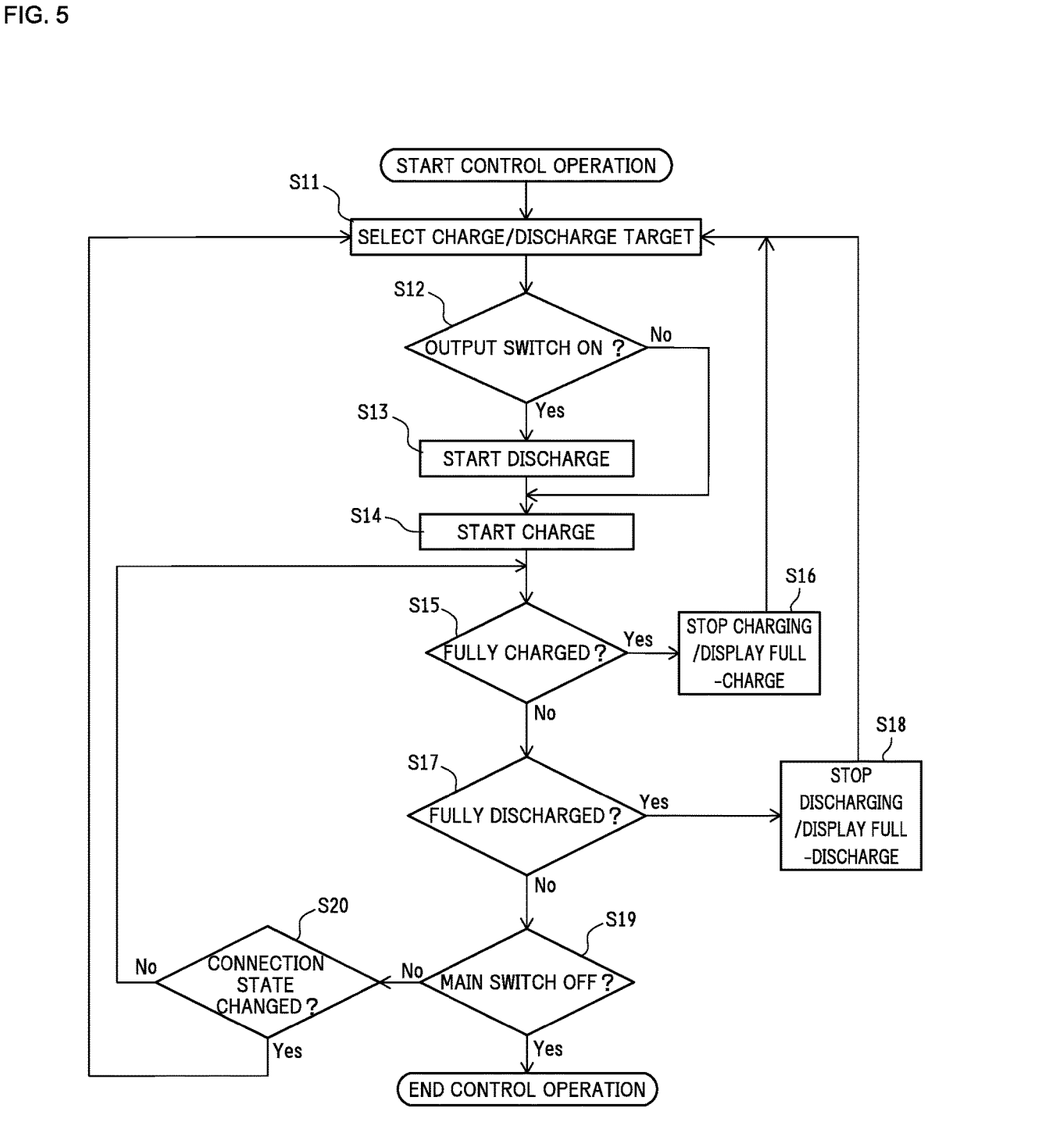
FIG. 5 is a flowchart illustrating a control operation of the battery units 30a to 30d by the power supply apparatus 100.

FIG. 5 is a flowchart illustrating a process for controlling the battery units 30a to 30d with the power supply device 100.

First, even in a case where the main switch 45 of the power supply device 100 is off, the main CPU 51 starts the initial operation illustrated in FIG. 4 when there is any one of the connection of the commercial power supply to the input unit 42a, the connection of the solar cell panels to the input unit 42b, and the connection of the battery units 30a to 30d. In a case where any one of these power supplies of the connections are connected to the power supply device 100, the electric power for driving the main CPU 51 can be supplied, and Step S1 can be executed according to a program stored beforehand.

Step S1 is a power-on reset step in which each unit of the power supply device 100 is initialized and activated. By executing this step, the power supply device 100 is set to an initial state, and preparations for accurately driving the power supply device 100 are made. The initial state is to turn off or neutralize the various switches, or to initialize the programs read into the main CPU 51. After the power-on reset step is completed, the process proceeds to Step S2.

Step S2 is a setup information acquisition step in which information of each unit included in the power supply device 100 is acquired. The information acquired in this step includes information pertaining to, for example, the on/off of various switches, whether the power supply is connected to the input units 42a and 42b, the voltage value being supplied to the input units 42a and 42b, and whether the is load is connected to the output unit 43. After the setup information acquisition step is completed, the process proceeds to Step S3.

Step S3 is a battery connection determination step in which information pertaining to whether the battery units 30a and 30b are connected and the state of the locking units 70 with respect to the battery units 30a and 30b are acquired. In a case where any one of the battery units 30a and 30b is connected, the process proceeds to Step S4. In a case where neither the battery unit 30a or 30b is connected, the process repeats Step S3 to wait until any one of the battery units 30a and 30b is connected.

Step S4 is a BMS (Battery Management System) activation step in which electric power is supplied to the connected battery units 30a-30d for activating the BMS installed in the battery units 30a-30d. After the BMS activation step is completed, the process proceeds to Step S5.

Step S5 is a battery information acquisition step in which each information pertaining to the battery units 30a and 30b is acquired from the BMS of the battery units 30a and 30b activated in Step S4.

The information acquired in this step includes information pertaining to, for example, the identification number individually assigned to the battery units 30a to 30d, the output voltage of the battery units 30a to 30d, and the remaining charge amount (SOCs: State of Charge) of the battery units 30a to 30d. After the battery information acquisition step is completed, the initial operation ends to become a standby state.

When the main switch 45 is turned on, the main CPU 51 starts the control operation illustrated in FIG. 5 and executes Step S11 in accordance with a program stored beforehand.

Step S11 is a charge/discharge target selection step in which the remaining charge amount provided by the BMS installed in the battery units 30a to 30d is acquired, and the priority of the battery units 30a to 30d to be charged and the priority of the battery units 30a to 30d to be discharged are determined. This step corresponds to the measuring step in the present invention.

Further, the input changeover switch 55 is switched to the side to which the power supply is connected based on whether there are power supply connections to the input units 42a and 42b. In a case where the commercial power supply and the solar cell panel are connected to both of the input units 42a and 42b, the connection to the input unit 42a connected to the commercial power supply is prioritized. Alternatively, the display unit 41 may display that two power supplies are connected, so that the one of the power supplies to be charged can be input and the connections can be switched according to the input result.

At this step, the higher the remaining charge amount of the connected battery units 30a to 30d, the higher the charge priority is set, and the lower the remaining charge amount, the higher the discharge priority is set. Among the battery units 30a to 30d, the one whose locking unit 70 is in the off state is detected (detection step), and the detected one is excluded from the charging target and the discharging target during the control operation (exclusion step). After the charge/discharge target selection step is completed, the process proceeds to Step S12.

Step S12 is an output switch detection step in which the on/off state of the output switch 44 is detected. In a case where the output switch 44 is in the on state, the process proceeds to Step S13. In a case where the output switch 44 is in the off state, the process proceeds to Step S14.

Step S13 is a discharge starting step in which the battery unit having the highest discharge priority determined in Step S11 is selected as a discharge target from among battery units 30a to 30d having a remaining charge amount equal to or more than a predetermined smallest charge amount (first predetermined amount) (output selection step). For example, in a case where the battery unit 30b is selected as a discharge target, the charge/discharge changeover switch 56b is switched to the side of the discharging terminal, and the battery unit 30b is connected to the DC/AC inverter 62 (output connection step). Thereby, the battery unit 30b is discharged by supplying electric power from the battery unit 30b to the load connected to the output unit 43. After the discharge start step is completed, the process proceeds to Step S14.

Step S14 is a charge starting step in which the battery unit having the highest charge priority determined in Step S11 is selected as a charge target from among battery units 30a to 30d having a remaining charge amount less than a predetermined permissible charge amount (second predetermined amount) (input selection step). For example, in a case where the battery unit 30c is selected as a charge target, the charge/discharge changeover switch 56c is switched to the side of charging terminal, and the battery unit 30c is connected to the input changeover switch 55 (input connection step). Thereby, the battery unit 30c is charged by connecting the battery unit 30c to the commercial power supply connected to the input unit 42a or the solar cell panel connected to the input unit 42b and supplying electric power from the commercial power supply or the solar cell panel to the battery unit 30c. After the charge starting step is completed, the process proceeds to Step S15.

Step S15 is a charge state determination step in which the remaining charge amount of the charge target selected from the battery units 30a to 30d is detected, and the detected remaining charge amount is determined whether it has reached the permissible charge amount. In a case where the remaining charge amount has reached the permissible charge amount, the process proceeds to Step S16. In a case where the remaining charge amount has not reached the permissible charge amount, the process proceeds to Step S17.

Step S16 is a charge stopping step in which the charging of the charge target is stopped, and the display unit 41 displays that the charge target is fully charged. For example, in a case where the battery unit 30c is the charge target, the charge/discharge changeover switch 56c is switched to the neutral side. After the charge stopping step is completed, the process proceeds to Step S11.

Step S17 is a discharge state determination step in which the remaining charge amount of the discharge target selected from the battery units 30a to 30d is detected, and the detected remaining charge amount is determined whether it is less than the smallest charge amount. In a case where the remaining charge amount is less than the smallest charge amount, the process proceeds to Step S18. In a case where the remaining charge amount is equal to or greater than the smallest charge amount, the process proceeds to Step S19.

Step S18 is a discharge stopping step in which the discharge from the discharge target is stopped, and the display unit 41 displays that the remaining amount of the discharge target is zero. For example, in a case where the battery unit 30b is the charge target, the charge/discharge changeover switch 56b is switched to the neutral side. After the discharge stopping step is completed, the process proceeds to Step S11.

Step S19 is an end determination step in which the on/off of the main switch 45 is detected. In the case where the main switch 45 is on, the process proceeds to Step S20. In the case where the main switch 45 is off, the control operation ends by switching all of the input changeover switch 55 and the charge/discharge changeover switches 56a to 56d to the neutral side.

Step S20 is a connection state detecting step in which the whether the connection states of the input units 42a and 42b, the output unit 43, and the battery units 30a to 30d have changed are detected. In a case where any one of these connection states have changed (for example, a case where the battery unit 30a is removed or a case where the connection with the solar cell panel is released), the process proceeds to Step S11. In a case where there is no change in the connection state, the process proceeds to Step S15.

With the power supply device 100, charging and discharging using plural battery units 30a to 30d can be continuously performed in parallel by executing the above-described control operation with the main CPU 51. A charging operation and a discharging operation by the power supply device 100 are described with reference to the following specific exemplary situation.

First, the battery units 30a to 30d are mounted on the housing 10, the solar cell panel is connected to the input unit 42b, and an electrical facility, which is a load, is connected to the output unit 43. At this stage, the initial operation illustrated in FIG. 4 is executed regardless of whether the main switch 45 is on or off, each part is initialized, and the remaining charge amount of each of the battery units 30a to 30d is detected.

When the main switch 45 is turned on, the control operation illustrated in FIG. 5 is executed.

At this time, the remaining charge amounts of the battery units 30a to 30d are assumed to be, for example, 100%, 20%, 80%, and 3%, respectively.

For example, in a case where the smallest charge amount is set to 5% and the permissible charge amount is set to 100%, the battery unit 30b having the smallest charge amount or more and having the smallest remaining charge amount is selected as the discharge target, and the charge/discharge changeover switch 56b is connected to the side of the discharging terminal. Further, the battery unit 30c having a charge amount less than the permissible charge amount and having the largest remaining charge amount is selected as the charge target, and the charge/discharge changeover switch 56c is connected to the side of the charging terminal. Because the solar cell panel is connected to the input unit 42b, the input changeover switch 55 is connected to the side of the input unit 42b.

As a result, the electric power generated by the solar cell panels is supplied to the battery unit 30c via the input unit 42b, the MPPT controller 53, the input changeover switch 55, and the charge/discharge changeover switch 55c. Thereby, the battery unit 30c is charged. Further, in a case where the output switch 44 is on, the battery unit 30b discharges electricity via the charge/discharge changeover switch 55b, the DC/AC inverter 62, and the output unit 43. Thereby, the battery unit 30b supplies electric power to the load.

In a case where the remaining charge amount of the battery unit 30c reaches 100% or where the remaining charge amount of the battery unit 30b becomes less than 5%, the charge target and the discharge target are reselected, respectively, so that charging and discharging are continued. Regarding the fully charged battery unit 30c and the fully discharged battery unit 30b, the display unit 41 displays the full charge of the battery unit 30c and the full discharge of the battery unit 30b.

Because the display unit 41 displays that the full charge and the full discharge, the battery unit 30b or the battery unit 30c can be replaced by releasing the locking unit 70 of the fully charged and fully discharged ones of the battery units 30a to 30d. When the battery unit 30b or 30c is replaced, it is detected that the connection state has changed. Thereby, the charging target and the discharging target are reselected. The control operation illustrated in FIG. 5 is executed even during this replacement operation. Accordingly, the charging target and the discharging target are selected from the battery units 30a to 30d that have not been replaced and whose locking unit 70 remains on. Thereby, charging and discharging are continued to be performed on the selected charging target and discharging target.

In this example, the battery unit 30c having the remaining charge amount of 80% is selected as the charge target. Therefore, the time for the battery unit 30c to reach the full charge is shorter than the time to charge the battery units having the remaining charge amount of 20% or 3%. As a result, the battery unit 30c that is fully charged at an early timing can be replaced with a new battery unit 30c' having a small remaining charge amount. Thereby, the chargeable capacity of the power supply device 100 as a whole can be increased.

Similarly, because the battery unit 30b having the remaining charge amount of 20% is selected as the discharge target, the time for the battery unit 30b to reach the total discharge is shorter than the time for discharging the battery units having the remaining charge amount of 100% or 80%. As a result, the battery unit 30b that is fully discharged at an early timing can be replaced with a new battery unit 30b' that is already charged. Thereby, the remaining charge amount of the power supply device 100 as a whole can be increased.

In view of the charging and the discharging with the power supply device 100, the power generation using the solar cell panel does not always ensure the same amount of power generation, and the power consumption by the load is not always constant. Therefore, in a situation where the amount of generated power is relatively large and the power consumption is small, the battery unit 30c which has been fully charged is replaced with a new battery unit 30c. Thereby, the rechargeable charge capacity can be increased. In a situation where the amount of generated power is relatively small and the amount of power consumed is large, the battery unit 30b that has been fully discharged is replaced with the battery unit 30c that has been fully charged, thereby increasing the remaining amount of charge that can be discharged. Accordingly, one can flexibly select whether to emphasize charging or discharging in accordance with the amount of generated power or the consumption of power.

As described above, in a situation where the power consumption by the load is large, battery units having a remaining charge amount as large as possible are preferred to be mounted as the battery units 30a to 30d. Thereby, the duration of power supply can be expanded. Further, in a case where the power consumption by the load is small or in a case where the output switch 44 is turned off without supplying power to the load, battery units having a remaining charge amount as small as possible are preferred to be mounted as the battery units 30a to 30d. Thereby, the duration of the charging operation can be expanded. With the power supply device 100 and the power supply control method of the present invention, the charging and the power supply using the plural battery units 30a to 30d can be efficiently continued and the charge capacity can be added by combining the replacement of the battery units 30a to 30d, the charging operation, and the discharging operation.

Second Embodiment

Next, a second embodiment of the present invention will be described. Description of the same content as that of the first embodiment is omitted. In the present embodiment, the remaining charge amounts of the battery units 30a to 30d are assumed to be 4%, 3%, 100%, and 100%, respectively. In this case, all of the battery units 30a to 30d are lower than the smallest charge amount or higher than the permissible charge amount. In this case, the full-charge and the full-discharge of the battery units 30a to 30d are displayed on the display unit 41 to recommend replacement.

Alternatively, the input function of the display unit 41 may be used to change the setting value of the minimum charge amount. Alternatively, the display unit 41 may have a forcible charge mode and a forcible discharge mode that allows the charge target and the discharge target to be forcibly selected from the battery units 30a to 30d.

The present invention is not limited to the above-mentioned embodiments, and various modifications can be made within the scope shown in the claims, and embodiments obtained by appropriately combining technical units disclosed in different embodiments are also included in the technical scope of the present invention.

DESCRIPTION OF THE REFERENCE NUMERALS

10 . . . Housing
11 . . . Handle
100 . . . Power supply device
20 . . . Wheel
30, 30a to 30d . . . Battery unit
31 . . . Battery main body
32 . . . Handle part
33 . . . Battery connector
40 . . . Operation panel
41 . . . Display unit
42a, 42b . . . Input unit
43 . . . Output unit
44 . . . Output switch
45 . . . Main switch
51 . . . Main CPU
52 . . . AC/DC converter
53 . . . MPPT controller
55 . . . Input changeover switch
56a-56d . . . charge/discharge changeover switch
57, 58 . . . DC/DC converter
59 . . . illumination switch
60 . . . indicator
61 . . . illumination unit
62 . . . DC/AC inverter

The invention claimed is:
1. A power supply device comprising:
a plurality of battery units replaceably connected to a battery connection part;
an output unit for outputting electric power from one of the battery units to loads external to the power supply device and the plurality of battery units;
an input unit for receiving/inputting external power and for supplying electric power to one of the battery units; and a control unit for controlling connection of the plurality of battery units with respect to the output unit and the input unit;

wherein the control unit is configured to select a battery unit having a remaining charge amount that is smallest among the plurality of battery units and equal to or greater than a first predetermined amount, and to connect the selected battery unit to the output unit, wherein the control unit is configured to select a battery unit having a remaining charge amount that is the largest among the plurality of battery units and less than a second predetermined amount, and to connect the selected battery unit to the input unit, wherein the control unit is configured to detect connection states of the input unit, the output unit, and the plurality of battery units, and to reselect the battery units to be connected to the input unit and the output unit in a case where any of the connection states changes.

2. The power supply device as claimed in claim 1, wherein the battery connection part includes a locking unit for securing a connection of each one of the plurality of battery units, wherein the control unit excludes each one of the plurality of battery units connected to the battery connection part from a control target in a case where the locking unit is in an unconnected state for the respective battery unit.

3. The power supply device as claimed in claim 1, wherein the selected battery unit is discharged by supplying electric power to the load connected to the output unit.

4. A power supply control method for controlling an electric power supply from a plurality of battery units replaceably connected to a battery connection part to an output unit being loads external to the power supply device and the plurality of battery units, and an electric power supply from an input unit, for receiving/inputting external power, to the plurality of battery units, the power supply control method comprising:

a measuring step for measuring a remaining charge amount of the plurality of battery units;

an output selection step for selecting a battery unit having a remaining charge amount that is smallest among the plurality of battery units and equal to or greater than a first predetermined amount;

an output connection step for connecting the output unit to the battery unit selected in the output selection step;

an input selection step for selecting a battery unit having a remaining charge amount that is largest among the plurality of battery units and less than a second predetermined amount;

an input connection step for connecting the input unit to the battery unit selected in the input selection step; and a connection state detection step for detecting connection states of the input unit, the output unit, and the plurality of battery units, and executing the output selection step and the input selection step in a case where any of the connection states changes.

5. The power supply control method as claimed in claim 4, further comprising:

a detection step for detecting a state of a locking unit that secures a connection of each one of the plurality of battery units; and an exclusion step for excluding each one of the plurality of battery units determined to be in an unconnected state in the detection step from a control target.

6. The power supply control method as claimed in claim 4, further comprising:

discharging the selected battery unit by supplying electric power to the load connected to the output unit.

* * * * *